(12) United States Patent
Ahrens

(10) Patent No.: US 6,510,364 B2
(45) Date of Patent: Jan. 21, 2003

(54) SELECTION AND BUNDLING METHOD FOR RANDOM LENGTH MATERIALS

(76) Inventor: Robert Ahrens, 7100 Wood Creek La., Lincoln, NE (US) 68516

( * ) Notice: Subject to any disclaimer, the term of this patent is extended or adjusted under 35 U.S.C. 154(b) by 0 days.

(21) Appl. No.: 09/845,804

(22) Filed: Apr. 30, 2001

(65) Prior Publication Data

US 2002/0159876 A1 Oct. 31, 2002

(51) Int. Cl.[7] .................................................. G06F 7/00
(52) U.S. Cl. ..................... 700/213; 198/358; 198/418.1; 198/418.2
(58) Field of Search ................................. 700/213, 240, 700/303, 33; 198/358, 418.1, 418.2, 418.3

(56) References Cited

U.S. PATENT DOCUMENTS

| | | | |
|---|---|---|---|
| 3,631,977 A | 1/1972 | Taul | 209/80 |
| 3,701,408 A | * 10/1972 | Northsea | 144/242.1 |
| 3,815,738 A | 6/1974 | Sweet et al. | 209/82 |
| 4,195,346 A | 3/1980 | Schroder | 364/475 |
| 4,205,751 A | 6/1980 | Rysti | 209/517 |
| 4,392,204 A | 7/1983 | Prim et al. | 364/478 |
| 4,943,328 A | 7/1990 | Quick | 156/64 |
| 5,161,697 A | 11/1992 | Quick | 209/552 |
| 5,351,833 A | 10/1994 | Quick | 209/518 |
| 5,613,827 A | 3/1997 | Vande Linde | 414/719.6 |
| 5,934,480 A | 8/1999 | Bailey | 209/517 |
| 6,148,884 A | 11/2000 | Bolyard et al. | 144/369 |

* cited by examiner

Primary Examiner—Khoi H. Tran

(57) ABSTRACT

A method for selecting random length boards for nesting into a single row of predetermined lengths includes the initial step of arranging a plurality of random length boards on an accumulating rack. A plurality of the boards are then conveyed to channels in an adjacent storage rack. The length of each board is determined as the board is conveyed from the accumulating rack to the storage rack, and this information is transmitted to a central processor. The processor calculates combinations of board lengths in the storage rack which will form a single stock row having a combined board length within a predetermined target range. The processor then selects a preferred combination of boards from the possible combinations, and activates gates in the channels to drop the boards to a conveyor and move the selected boards to a stock row accumulating location. The processor then activates gates on the accumulating rack tracks to convey additional boards to empty channels in the storage rack, and repeats the process. The apparatus includes an accumulating conveyor with longitudinal tracks positioned adjacent a storage rack with longitudinal channels aligned with the tracks. A scanning assembly is positioned between the accumulating conveyor and storage rack for scanning boards moving between the conveyor and storage rack, to determine the length of each board. The central processor is connected to the scanning assembly, and gates on the accumulating rack and storage rack, to automatically operate the system.

4 Claims, 5 Drawing Sheets

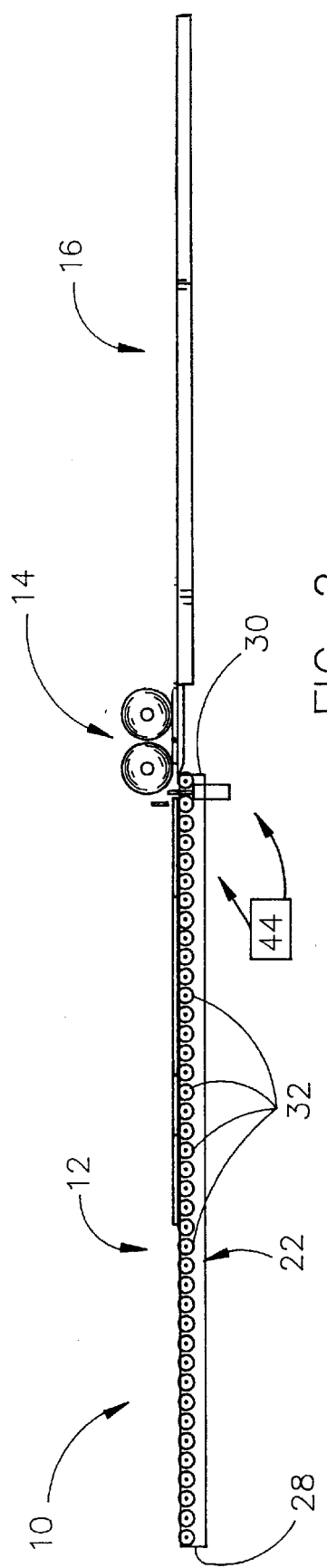
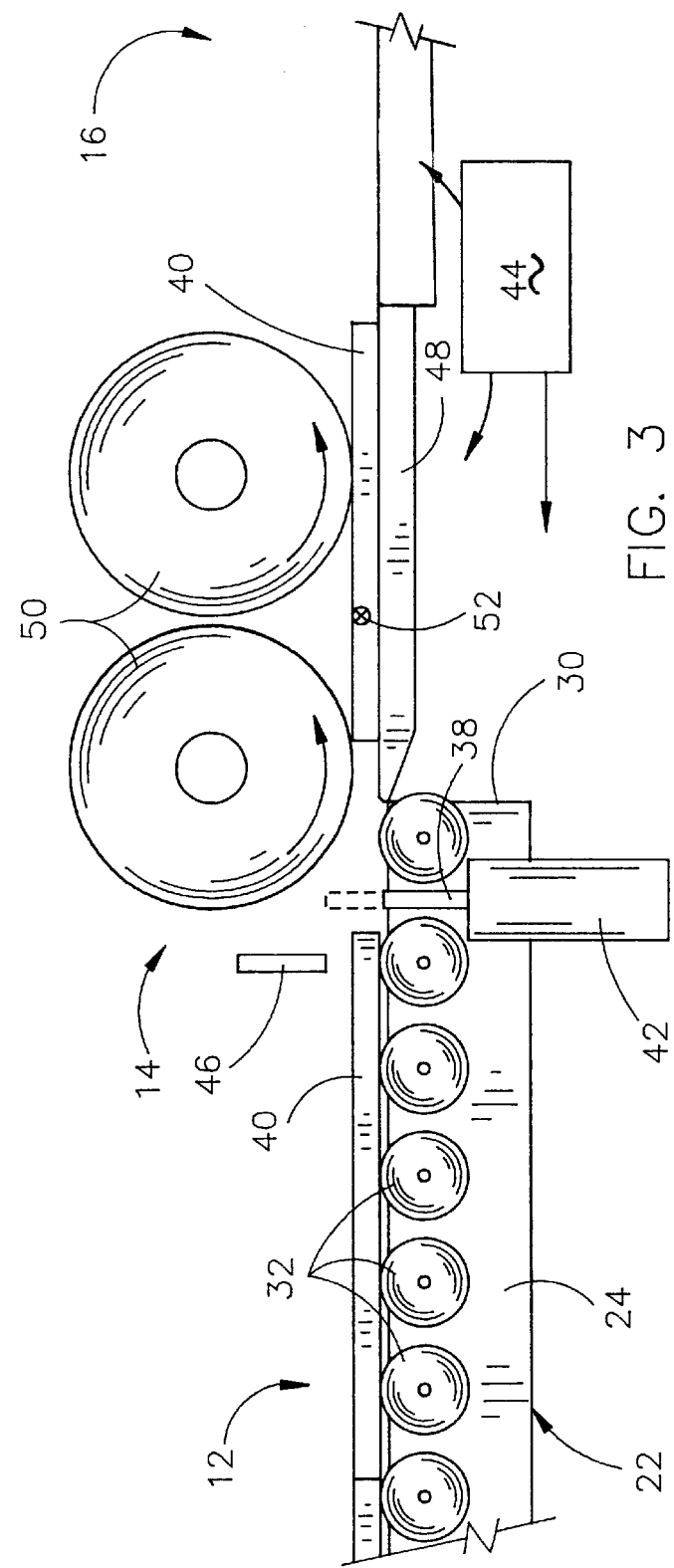

SELECTION AND BUNDLING METHOD FOR RANDOM LENGTH MATERIALS

CROSS-REFERENCES TO RELATED APPLICATIONS (Not applicable)

STATEMENT AS TO RIGHTS TO INVENTIONS MADE UNDER FEDERALLY SPONSORED RESEARCH AND DEVELOPMENT (Not applicable)

BACKGROUND OF THE INVENTION (1) Field of the Invention

The present invention relates generally to apparatus for selecting random length materials, such as wood flooring stock and bundling nested combinations into a standard length, and more particularly to an improved apparatus for automated sorting of a plurality of random length stock into standard length combinations for bundling.

(2) Background Information

Solid wood flooring is typically produced in random lengths which vary from nine inches to eight feet long. The length is determined by cuts made to remove randomly placed defects in the natural raw material.

The flooring stock is typically shipped in standard bundles ranging from seven to eight feet long, and therefore the flooring stock is conventionally bundled in one of two ways: (1) sorting by length to the nearest even foot in length, with various length bundles included on a single pallet; and (2) nesting various lengths of wood stock into a standard bundle, typically seven to eight feet long. In either case, the top layer of flooring in each bundle is inverted, so that the face of the product is protected from damage during shipping and handling.

Nesting is becoming the preferred method of bundling, because it is easier to handle and ship and typically assures a random assortment of lengths for the installer.

The most popular method for assembling random length wood flooring into nested bundles uses people to manually assemble the bundles. Generally, a person will first determine the grade of the flooring board by visual inspection. The inspected stock is then placed into a rack and sorted by its approximate length. A person on the other side of the rack will then remove selected pieces from one or more slots in the rack, visually judging the lengths to make a row of the desired standard length, when the pieces are nested end to end. In this method, the wood stock is generally sorted into approximate one foot increments. However, rarely are the boards exactly cut to the foot, and therefore are either longer or shorter than the increment slot in the rack in which it is placed. For this reason, once a combination of pieces is selected by the person assembling the bundle, it is often necessary to remove and replace various pieces to adjust the overall length of the nested row to fit the predetermined standard.

On the other hand, if the person grading the stock sorts the stock into racks with smaller increments, the sorting rack must necessarily be larger, and more time must be spent determining the proper slot in the rack for storage, as well as determining appropriate lengths for selection and nesting into the desired predetermined length row.

In some cases, a separate automated sorting mechanism is used to sort the wood stock by approximate length after grading. However, the nesting process is still currently accomplished manually by people. After enough rows of a proper length have been selected (usually twelve to fifteen rows for standard strip flooring) the top layer of product is manually inverted to protect the upper face of the product. The bundle is then tied together with plastic straps by a banding machine and the bundles are palletized for shipping.

As each row of nested lengths are assembled into a stack forming a bundle, each row is typically abutted flush, allowing the distal ends of the rows to vary. Thus, the bundle will typically include a proximal end with all rows abutted flush, and a distal end with a "jagged" appearance because of the various completed lengths of rows.

In an alternative bundling method, each end of the pieces of material are abutted against stops, forming flush ends, with the gaps between nested pieces located in the middle of the bundle. Frequently, the interleaving of the pieces in this particular method is not adequate to hold the bundle together and the bundle is not as secure when bound. This method also makes it more difficult to estimate the total actual footage of the material in the bundle. Because the longest and shortest rows in the bundle are typically four to six inches longer or shorter than the predetermined average, longer pallets are necessary for shipping and storage.

In forming a "jagged end" bundle, the bundle assembler typically starts with a long piece of wood stock, or a combination of short pieces, and then chooses a short piece that will nest with the initial piece or pieces to approximate the desired predetermined length. This results in most of the short pieces being located at the jagged end of the bundle, which can then be easily dislodged from the bundle during handling and shipping. Frequently, when a truck or container of flooring is opened at its destination, dozens of short pieces of flooring have fallen from the bundles, with no way of determining which piece belongs to which bundle. This in turn results in a shortage of wood product from bundles, to the end user.

The process of assembling bundles is further complicated by the measuring rules commonly used in this industry. A standard machining or "end matching" allowance of ¾ inch is allowed on each piece of flooring. End matching is the process of putting a groove on one end of a piece of flooring stock and a tongue on the other end. The tongue and groove then interlock to prevent displacement of the ends of the flooring over time. The standard method of measurement for wood flooring calls for the addition of ¾ inch to the length of the face of each piece, in order to allow for the material which is necessarily removed by the end matching process. This means that, if a row is being assembled for a standard length bundle, it may be ¾ inch short if the row consists of one piece of wood stock, 1½ inches short if made up of two pieces of wood stock, etc. In practice, the average length is assumed, and the target bundle length is shortened by the required amount.

Industry grading rules also require a minimum average length for each grade. The system of the present invention allows the processor to easily keep track of this information.

The current process of creating nested rows to form bundles by hand is time consuming, tedious, and proficiency requires consider experience. Some bundle assemblers never become good at choosing an acceptable combination of wood stock lengths on the first or second try, and therefore must spend additional time in a trial and error process to form a bundle. Further, the manual process of selecting rows for a bundle is not particularly accurate when assembled by hand, especially if the person assembling the bundle is in a hurry to create the bundle.

Further, once assembled, it is difficult to obtain an accurate measure of the material which is included in each bundle, especially if the method of forming the bundle with two flush ends is utilized.

BRIEF SUMMARY OF THE INVENTION

It is therefore a general object of the present invention to provide an improved method and bundling apparatus for selecting random length pieces of product to form standard length bundles.

Another object is to provide a bundling apparatus which is automated to improve the accuracy of the overall length of rows within a bundle.

A further object of the present invention is to provide an automated bundling apparatus which is capable of documenting the length of pieces within a bundle more accurately than possible when assembled by hand.

Yet another object is to provide an automated bundling apparatus in which the number of pieces in a row of a bundle is automatically tracked, to automatically compensate for end matching allowance.

Still another object is to provide a bundling apparatus which is capable of tracking minimum average length information for each grade of product.

These and other objects of the present invention will be apparent to those skilled in the art.

The method and apparatus for selecting random length boards for nesting into a single row of predetermined lengths includes the initial step of arranging a plurality of random length boards on an accumulating rack. A plurality of the boards are then conveyed to channels in an adjacent storage rack. The length of each board is determined as the board is conveyed from the accumulating rack to the storage rack, and this information is transmitted to a central processor. The processor calculates combinations of board lengths in the storage rack which will form a single stock row having a combined board length within a predetermined target range. The processor then selects a preferred combination of boards from the possible combinations, and activates gates in the channels to drop the boards to a conveyor and move the selected boards to a stock row accumulating location. The processor then activates gates on the accumulating rack to convey additional boards to empty channels in the storage rack, and repeats the process. The apparatus includes an accumulating conveyor with longitudinal tracks positioned adjacent a storage rack with longitudinal channels aligned with the tracks. A scanning assembly is positioned between the accumulating conveyor and storage rack for scanning boards moving between the conveyor and storage rack, to determine the length of each board. The central processor is connected to the scanning assembly, and gates on the accumulating rack and storage rack, to automatically operate the system.

BRIEF DESCRIPTION OF THE SEVERAL VIEWS OF THE DRAWING

The preferred embodiment of the invention is illustrated in the accompanying drawings, in which similar or corresponding parts are identified with the same reference numeral throughout the several views, and in which:

FIG. 2 is a side elevational view of the stock accumulating section, scanning section, and storage section of the bundling apparatus;

FIG. 3 is an enlarged view of a portion of FIG. 2;

DETAILED DESCRIPTION OF THE INVENTION

Figure 1:
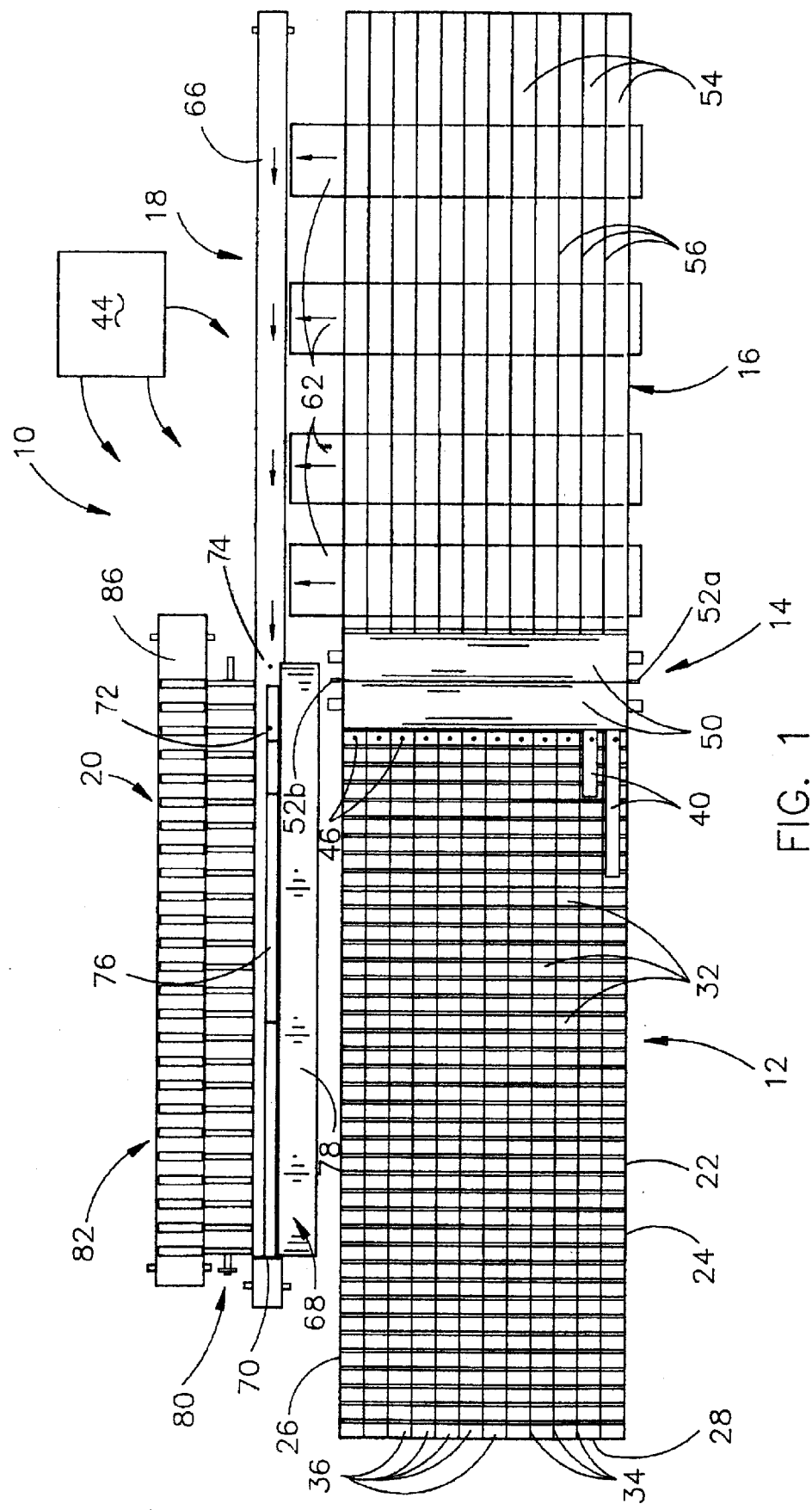
FIG. 1 is a top plan view of the bundling apparatus of the present invention.

Referring now to the drawings, and more particularly to FIG. 1, the selection and bundling apparatus of the present invention is designated generally at 10 and includes an accumulating conveyor 12, a scanning assembly 14, a storage rack 16, a row accumulating section 18, and a bundling mechanism 20.

Referring now to FIGS. 1 and 2, accumulating conveyor 12 includes a support frame 22 formed of a pair of parallel and longitudinally extending side frames 24 and 26, a forward end 28 and a rearward end 30. A plurality of powered rollers 32 are arranged parallel to one another and extend transversely between side frames 24 and 26 from forward end 28 to rearward end 30. Rollers 32 are oriented coplanar and are powered to rotate in the same direction, so as to carry wood stock placed on the forward end towards the rearward end of frame 22. A plurality of longitudinally extending parallel dividers 34 are spaced above the rollers to form a plurality of longitudinally extending tracks in which wood stock is placed and carried on rollers 32. Preferably, the rollers 32 of accumulating conveyor 12 are operated at a speed which carries the wood stock at a rate of approximately 60 feet per minute.

Referring now to FIGS. 1 and 3, each track 36, formed between pairs of divider walls 34, has an operable gate 38 movable between a stop position projecting upwardly into the path of wood stock 40 in track 36, and a lowered position (shown in solid lines in FIG. 3) permitting stock 40 to pass by gate 38 within track 36. Gate 38 is preferably operated by a pneumatic cylinder 42 or the like, which in turn is connected to a central control 44. Central control 44 thereby selectively operates gate 38 to permit or stop the passage of stock 40 within each track 36.

As shown in FIG. 1, accumulating conveyor 12 includes a plurality of tracks 36, each of which will hold a plurality of individual pieces of wood stock 40. Each piece of stock is preferably of uniform width and thickness, but has a variety of unequal, random lengths based upon cuts made to remove defects from the natural raw material. A sensor 46 is located proximal the rearward end 30 of frame 22 in each track 36, in order to detect the presence of a piece of stock 40 in each of the particular tracks 36. Sensor 46 is shown schematically above the accumulating conveyor 12, but could be located below the conveyor between rollers 32, as well. Sensors 46 may be of any conventional mechanical, ultrasonic, conductive or photoelectric switch, and are all connected to central control 44 to transmit a signal to the central control indicating the presence of a piece of stock 40 within the track and stopped at the gate 38. When central control 44 determines that a piece of stock 40 in a particular track 36 is ready to continue to the scanning area, it will send a signal to cylinder 42 to drop gate 38, allowing the stock to move past the gate on the powered rollers 32.

Referring now to FIG. 3, scanning assembly 14 includes a horizontal, low friction, wear resistant bed plate 48 extending from the rearward end 30 of accumulating conveyor frame 22 to the forward end of storage rack 16. Bed plate 48 is positioned at a height coplanar with the tops of rollers 32, such that wood stock 40 passing past gate 38 will slide across the top surface of bed plate 48 after leaving the rearward most roller 32.

A pair of constant speed feed rollers are positioned parallel to one another and slightly spaced apart, oriented transversely to the direction of travel of stock 40, and spaced above the bed plate 48 a distance such that the feed rollers will engage and feed stock 40 by friction between the feed rollers 50 and bed plate 48.

Feed rollers 50 rotate at a speed to feed stock 40 at a rate of about 240–250 feet per minute, much faster than the speed of travel of stock 40 on the accumulating conveyor 12. Because feed rollers 50 propel the stock 40 at a faster rate than accumulating conveyor 12, a gap develops between multiple pieces of stock within the same track 36. The central control 44 will detect this gap via sensor 46, and trigger cylinder 42 to raise gate 38 to the stop position, to thereby halt the movement of the next piece of stock 40.

Scanning assembly 14 includes a sensor 52 for determining the length of each piece of wood stock 40 which passes through the scanning assembly 14. In the preferred embodiment of the invention, a photoelectric sensor including a transmitter 52a and receiver 52b (shown in FIG. 1) is arranged horizontal between feed rollers 50 and parallel to feed rollers 50, at a height above bed plate 48 such that wood stock 40 will break the photoelectric beam as it passes over the top of bed plate 48 as it is fed by feed rollers 50. Sensor 52 is connected to central control 44, and the central control will detect the time at which the leading edge of a piece of stock 40 breaks the beam between transmitter 52a and receiver 52b, and the time at which the stock no longer interrupts the lightbeam. Because feed rollers 50 are rotated at a known constant speed, the length of the piece of stock 40 can be determined by the elapsed time that the lightbeam is interrupted. A pair of feed rollers 50 are utilized, a first feed roller upstream of the sensor and a second feed roller downstream of the sensor 52, such that the wood stock 40 is moved at a constant rate of speed as it passes through the beam of sensor 52.

An alternative to the use of a timer would be the use of a sensor on a cog wheel attached to feed rollers 50. The teeth on the cog wheel are counted by the controller as the feed rollers 50 rotate during the period of time that a board is sensed by the sensor. Other similar and equivalent methods of measuring boards are contemplated by the inventor.

While a single transmitter 52 is shown in the preferred embodiment of the invention for detecting the length of all of the pieces of wood stock 40 passing through the scanning area, a separate sensor could be utilized with each track 36, or with a group of tracks 36, if a faster scanning rate is desired.

Figure 4:
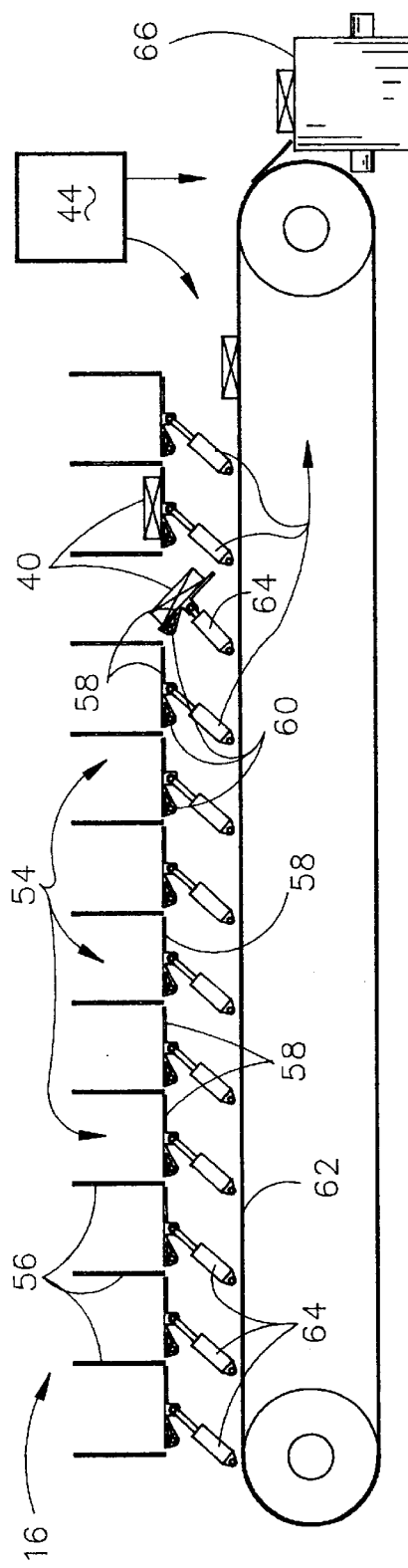
FIG. 4 is an enlarged end elevational view of the bundling apparatus taken from the right end of FIG. 1.

Referring now to FIGS. 1 and 3, feed rollers 50 advance the wood stock 40 through the scanning assembly 14 to storage rack 16. Storage rack 16 includes a plurality of channels 54 directly aligned with each of tracks 36, to receive wood stock 40 from each of tracks 36. As shown in FIG. 4, each of channels 54 is separated by parallel side walls 56 and a bottom gate 58. Each bottom gate 58 is pivotally mounted along one edge on a hinge 60 to permit a piece of wood stock 40 to be selectively dropped out the bottom of the channel 54 onto a cross-feed conveyor 62. As shown in FIG. 4, each bottom gate 58 has a pneumatic cylinder 64 connected thereto for pivoting the gate 58 between a generally horizontal storage position, and a sloped "drop" position.

A plurality of cross-feed conveyors 62 are arranged transversely under storage rack 16, and are preferably belt conveyors. Conveyors 62 move wood stock 40 dropped from storage rack 16, transversely to a row accumulator conveyor located in the row accumulating section 18 immediately adjacent the storage rack 16. Each cylinder 64 is connected to central control 44 such that central control 44 selectively drops the appropriate gates 58 to select particular pieces of wood stock 40 to row accumulating section 18. As each piece of wood stock 40 reaches the end of cross-feed conveyors 62, it drops on to the row accumulator conveyor 66, which transports the wood stock 40 longitudinally to a row accumulator apparatus 68 in row accumulating section 18 (as shown in FIG. 1). Row accumulator apparatus 68 includes a stop gate 70 located at the downstream end of accumulating conveyor 66, operable between a stop position projecting downwardly into the path of wood stock 40 being carried on conveyor 66, and an upper position permitting wood stock to travel past the gate to be fed back to the operator at the entry point of the selection and bundling apparatus 10. A pair of sensors 72 and 74 are positioned over accumulating conveyor 66 and spaced upstream of stop gate 70 predetermined distances. As noted above, a row of wood stock is accumulated to a predetermined length which desirably falls between minimum and maximum target lengths. The minimum target length is detected by sensor 72 and the maximum target length is detected by sensor 74, positioned upstream of sensor 72.

For example, if the minimum and maximum target lengths are seven feet and eight feet respectively, wood stock 40 will be carried by accumulating conveyor 66 to stop gate 70. Each subsequent piece of wood stock will contact a previous piece to form an accumulated row length. If the selected pieces form a length which does not reach to the location of sensor 72, the central control 44 will reject the entire row and recirculate the stock back to the operator for placement on the accumulating conveyor 12. If the row of accumulated wood stock is detected by sensor 72 but not detected by sensor 74, then the central control 44 will have confirmation that the accumulated length of the wood stock pieces is within the minimum and maximum target lengths, and will proceed with processing. If both sensors 72 and 74 detect a piece of wood stock, then central control 44 will recognize that the accumulated row length is beyond the maximum parameters, will reject the row, and will activate stop gate 70 to recirculate the wood stock back to the operator for placement back in the accumulating conveyor 12.

Gate 70 also permits the selection and bundling apparatus to purge the storage rack 16 of stock, such as upon startup or the like.

Figure 5:
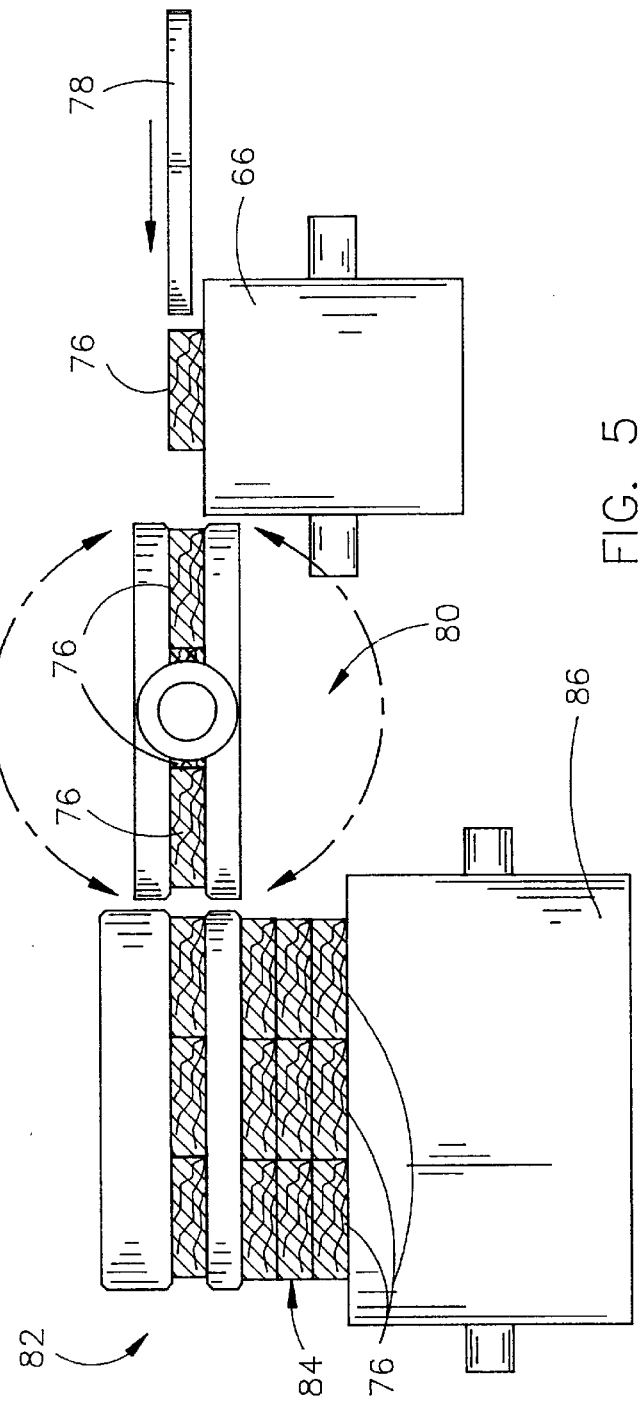
FIG. 5 is an enlarged end elevational view of the bundling mechanism of the apparatus.

Referring now to FIG. 5, if the accumulated row of stock, designated generally at 76 is within the appropriate length parameters, it is pushed transversely from the accumulating conveyor 66 by a pneumatic pusher 78 on to a layer accumulator 80. The layer accumulator holds a plurality of stock rows 76 until a sufficient number of rows are accumulated for a particular bundle width. FIG. 5 shows a bundle width of three stock rows 76. Once a sufficient number of rows has accumulated to form a layer, the same pneumatic pusher 78 pushes the entire layer on through the layer accumulator 80 into the bundle accumulator 82. A plurality of layers are subsequently stacked on the bundle accumulator 82 to a predetermined height for a bundle 84.

The layer accumulator 80 is pivotally mounted along a central longitudinal axis so that the last layer to be stacked on bundle 84 may be inverted before placement on top of the bundle. Once bundle 84 has been formed, an out-feed conveyor 86 transports the bundle to the bundle packaging station (not shown).

Referring once again to FIG. 1, the central controller 44 includes a processor which is programmed to automate the entire selection and bundling apparatus 10. As each piece of wood stock 40 moves from a track 36 through scanning assembly 14 to storage rack 16, the controller stores the length of the particular board along with the location of that board in storage rack 16. Once all, or a predetermined number of channels 54 in storage rack 16 are filled with wood stock, the central controller 44 is programmed to determine the best combination of lengths available to fit the target length of an accumulated stock row 76.

The central controller 44 may select as few as one board, or as many as five or six pieces to best fit the target length row. However, the computer program biases the selection process to give preference to longer pieces in making the piece selections for a stock row 76, rather than having the controller determine the absolute best mathematical solution. This is because the best mathematical solution has a tendency to utilize shorter pieces first, since a row with many short pieces will have more possible combinations and therefore will more easily fit an accurate target length. If this occurs, only long pieces would be left in the storage rack, and a combination of long pieces would not fit the target length.

In operation, the initial step in operating bundling apparatus 10 is in the supplying of wood stock to accumulating conveyor 12. This may be accomplished either manually, or by other automated apparatus, to substantially fill conveyor 12 with random lengths of stock 40.

Figure 6:
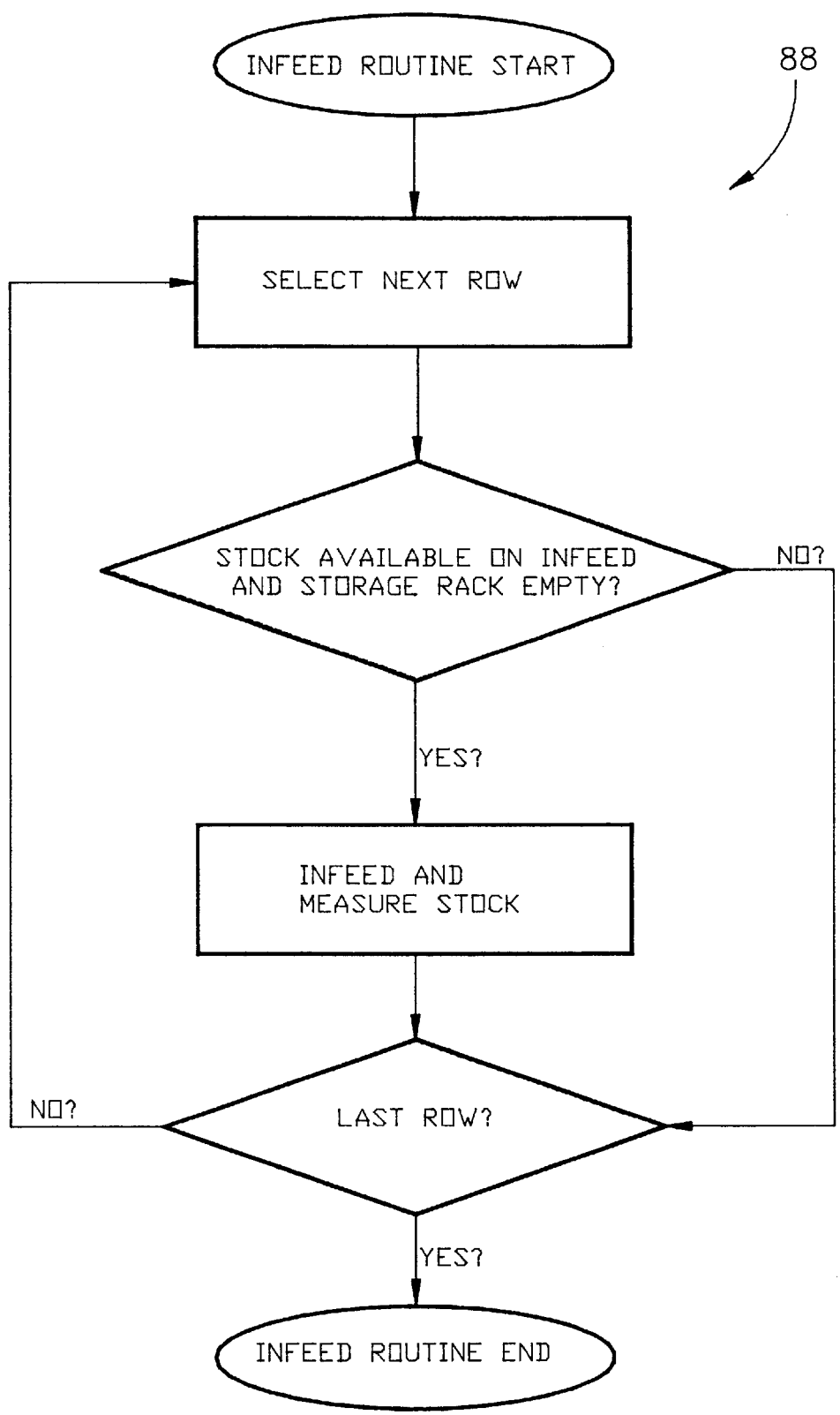
FIG. 6 is a flowchart showing the method for restocking the storage section of the bundling apparatus.

Referring now to FIG. 6, the central processor 34 executes an in-feed routine designated generally at 88 in order to fill channels 56 of storage rack 16 (as shown in FIG. 1). This routine includes the step of selecting one row or channel of storage rack 16 and determining whether the particular row is empty, and also detects whether there is any wood stock available on the in-feed accumulating conveyor 12. If either there is no stock available or the storage rack row is not empty, the routine determines whether the detected row is the last row of storage rack 16. If not, it repeats the sequence with the next subsequent row of the storage rack.

If the storage rack row is empty and the in-feed conveyor has stock available, then the in-feed routine will activate a gate 38 to permit a piece of wood stock to be fed and measured in scanning apparatus 14 and stored in the empty channel of storage rack 16. This process is then repeated for each channel 56 of storage rack 16 until all of the channels have been checked and filled if possible.

Figure 7:
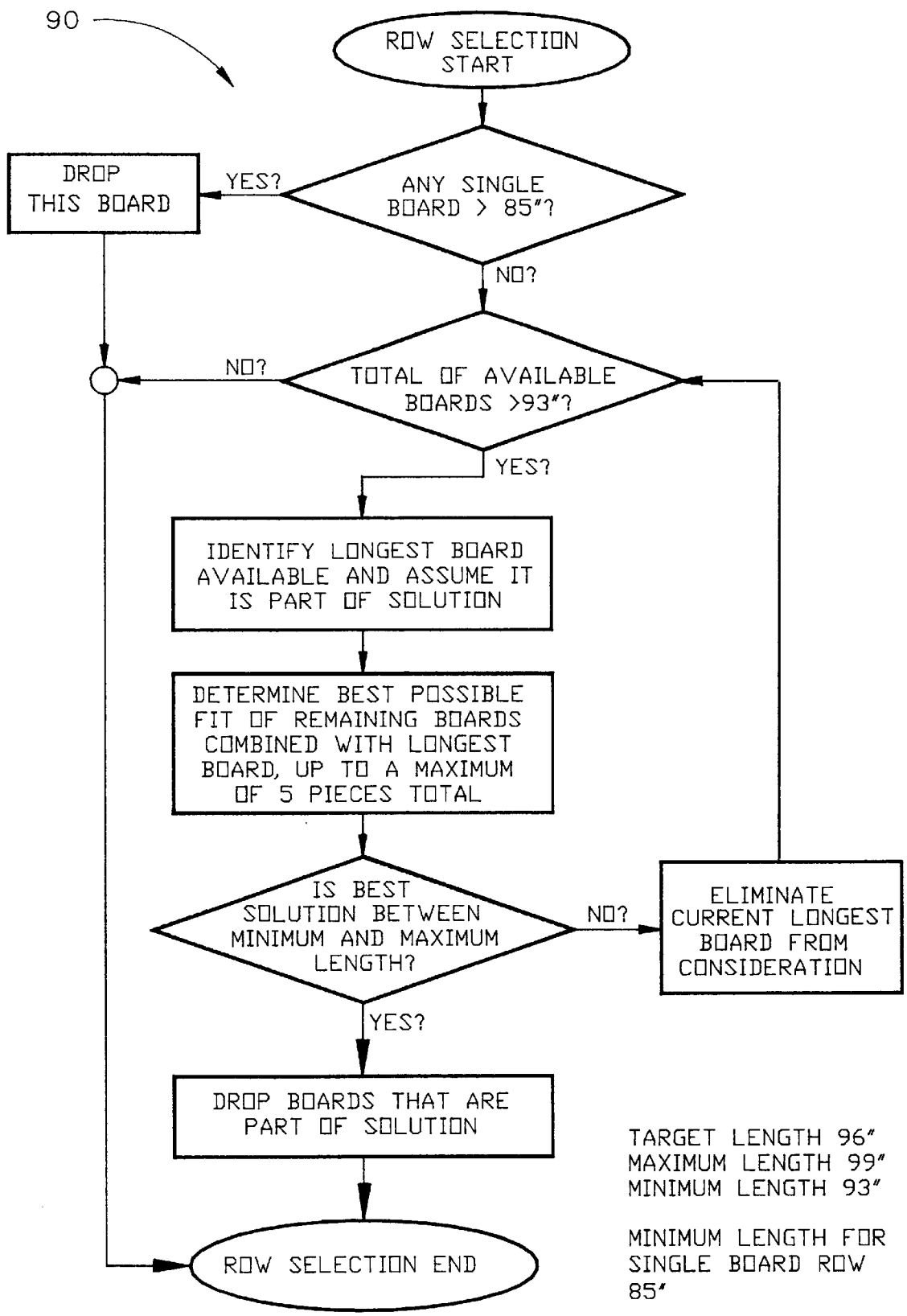
FIG. 7 is a flowchart showing the method for selecting boards of the apparatus.

Once storage rack 16 has filled to a predetermined capacity, central controller 44 will initiate the stock row selection routine 90, shown in detail in FIG. 7. As discussed above, the central controller will first look to determine whether a single board is present in one of channels 56 which has a length greater than 85 inches. If so, the controller will activate the bottom gate 58 of the selected channel 54 to drop the board on the cross-feed conveyor and advance the board to the row accumulating conveyor 66 (as shown in FIG. 4).

Once there is an empty row 54 in storage rack 16, the central controller will then go back to the in-feed routine 80 to fill that row, assuming that additional wood stock is available on accumulating conveyor 12.

If no single board in storage rack 16 has a length greater than 85 inches, the stock row selection routine then determines whether the total length of the available boards is greater than 93 inches. If not, then no combination of boards can be combined to meet the target length range, and either additional boards will be added to storage rack 16, or the controller 44 will wait for more stock to appear on the in-feed conveyor 12.

Assuming that the total length of the available boards is greater than 93 inches, then the stock row selection routine will first identify the longest board available and assume that it is part of the solution. Central controller 44 then determines the best possible fit of remaining boards combined with the longest board, up to a maximum of five total boards. If the best solution does not fall between the minimum and maximum length (in this case 93 inches and 99 inches, respectively) then the routine will eliminate the longest board from consideration and continue the routine using the next longest board. This will repeat until the best solution falls between the minimum and maximum length. Central controller 44 will then open the bottom gates 58 of the selected channels 54 to drop the boards that are part of that solution. The central controller then returns to the in-feed routine to resupply the storage rack 16, as described above.

Whereas the invention has been shown and described in connection with the preferred embodiment thereof, many modifications, substitutions and additions may be made which are within the intended broad scope of the appended claims.

I claim:

1. A method of selecting a plurality of random length boards for nesting into a single row of predetermined target length range, comprising the steps of:

arranging a plurality of random length boards on an accumulating rack;

conveying a plurality of the boards from the accumulating rack to a plurality of channels in a storage rack, with one board located in each channel;

determining the length of each conveyed board as the boards are conveyed to the storage rack;

transmitting length information to a central processor, identifying each board length in each channel;

said processor calculating the best possible combination of at least one board length to form a single stock row having a combined total board length within the target length range;

the processor selecting the at least one board from the calculated combination to form a first stock row; and the processor activating gates in the channels containing the selected at least one board, to convey the at least one board to a stock row accumulating location.

2. The method of claim 1, further comprising the steps of:

after the gate activation step, the processor closing the activated gates and then replenishing empty channels of the storage rack with additional boards.

3. The method of claim 1, wherein the step of selecting the first plurality of boards from the calculated combinations includes the step of the processor prioritizing the calculated combinations according to programmed priority parameters, and further comprising the step of selecting the combination with the highest priority.

4. The method of claim 3, wherein the prioritizing step includes the step of the processor assigning the highest priority to the longest board in the storage rack.

* * * * *